United States Patent
Choi

(10) Patent No.: US 9,310,218 B2
(45) Date of Patent: Apr. 12, 2016

(54) APPARATUS AND METHOD FOR DISPLAYING A POINT OF INTEREST

(75) Inventor: Wonkyung Choi, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 11 days.

(21) Appl. No.: 13/814,774

(22) PCT Filed: Jul. 19, 2011

(86) PCT No.: PCT/KR2011/005280
§ 371 (c)(1),
(2), (4) Date: Feb. 7, 2013

(87) PCT Pub. No.: WO2012/020929
PCT Pub. Date: Feb. 16, 2012

(65) Prior Publication Data
US 2013/0138343 A1    May 30, 2013

(30) Foreign Application Priority Data
Aug. 12, 2010  (KR) .................. 10-2010-0077722

(51) Int. Cl.
G01C 21/10 (2006.01)
G01C 21/24 (2006.01)
G01C 21/34 (2006.01)
G01C 21/36 (2006.01)

(52) U.S. Cl.
CPC ........ G01C 21/3476 (2013.01); G01C 21/3679 (2013.01)

(58) Field of Classification Search
USPC ................................ 701/527, 411
See application file for complete search history.

(56) References Cited

U.S. PATENT DOCUMENTS

| | | | |
|---|---|---|---|
| 7,155,339 B2* | 12/2006 | Tu | 701/426 |
| 7,181,344 B2* | 2/2007 | Lehmann et al. | 701/461 |
| 7,386,392 B1* | 6/2008 | Kabel et al. | 701/412 |
| 7,546,207 B2* | 6/2009 | Nix et al. | 701/431 |
| 7,889,101 B2* | 2/2011 | Yokota | 340/995.19 |
| 7,991,545 B2* | 8/2011 | De Silva et al. | 701/426 |
| 8,335,643 B2* | 12/2012 | Vandivier et al. | 701/411 |
| 8,694,247 B2* | 4/2014 | Lee | 701/438 |
| 2003/0182052 A1* | 9/2003 | DeLorme et al. | 701/201 |
| 2005/0038599 A1* | 2/2005 | Lehmann et al. | 701/208 |
| 2005/0046615 A1* | 3/2005 | Han | 342/357.06 |
| 2005/0273252 A1 | 12/2005 | Nix et al. | |

(Continued)

FOREIGN PATENT DOCUMENTS

CN  101046383 A  10/2007
CN  101122468 A  2/2008

(Continued)

OTHER PUBLICATIONS

CN Office Action.

(Continued)

*Primary Examiner* — Thomas G Black
*Assistant Examiner* — Tyler Paige
(74) *Attorney, Agent, or Firm* — Fox Rothschild LLP

(57) ABSTRACT

The present invention relates to an apparatus and method for displaying a point of interest (POI). According to the present invention, a screen for path guiding and a screen for POI guiding can be simultaneously and separately provided, thereby facilitating the recognition of a POI and increasing the accessibility to a POI while driving.

16 Claims, 14 Drawing Sheets

(56) References Cited

U.S. PATENT DOCUMENTS

| | | | |
|---|---|---|---|
| 2006/0190172 A1* | 8/2006 | Cross et al. | 701/213 |
| 2008/0154488 A1* | 6/2008 | Silva et al. | 701/201 |
| 2008/0252439 A1* | 10/2008 | Yamamoto et al. | 340/461 |
| 2009/0281727 A1* | 11/2009 | Nagatani et al. | 701/210 |
| 2010/0094536 A1* | 4/2010 | Lee et al. | 701/201 |
| 2010/0146546 A1* | 6/2010 | Nishimura et al. | 725/39 |
| 2011/0109473 A1* | 5/2011 | Fujimoto et al. | 340/901 |
| 2012/0179361 A1* | 7/2012 | Mineta et al. | 701/410 |
| 2012/0209506 A1* | 8/2012 | Tamayama et al. | 701/410 |
| 2013/0138343 A1* | 5/2013 | Choi | 701/527 |

FOREIGN PATENT DOCUMENTS

| | | |
|---|---|---|
| JP | 2004-355075 | 12/2004 |
| KR | 10-0521056 | 10/2005 |
| KR | 10-2007-0101558 | 10/2007 |

OTHER PUBLICATIONS

Translation of CN Office Action.
Translation of Abstract for CN 101046383 A.
Translation of Abstract for CN 101122468 A.

* cited by examiner

APPARATUS AND METHOD FOR DISPLAYING A POINT OF INTEREST

CROSS REFERENCE TO RELATED APPLICATION

This application is the national phase under 35 USC 371 of international application no. PCT/KR2011/005280, filed Jul. 19, 2011, which claims the benefit of the priority date of Korean Patent Application No. 10-2010-0077722 filed on Aug. 12, 2010. The contents of the aforementioned applications are incorporated herein in their entirety.

TECHNICAL FIELD

The present invention relates to an apparatus and method for displaying a point of interest (POI).

BACKGROUND ART

A navigation system usually refers to a system intended for providing information supporting navigation of a vehicle such as a car by utilizing satellites; it is also called an autonomous driving system. The navigation system contains geometry data for the entire map and point-of-interest information (hereinafter, it is called 'POI' information for short) describing a building, a road, and the like on the map, making use of the geographic information and POI information for path guidance.

State-of-the-art navigation systems are now being equipped with a function of displaying locations of sales offices according to business types on its map and providing information of various kinds of POIs around a current position of a vehicle, as well as providing a determined navigation path.

Therefore, there are needs for a means of displaying information of POIs efficiently without interfering with drivers.

DISCLOSURE

Technical Problem

An objective of the present invention is to provide a driver with an apparatus and method for displaying a POI to facilitate recognition of the POI while driving.

The objective above does not limit the present invention; other objectives not mentioned in this document would be easily understood by those skilled in the art from the descriptions provided below.

Technical Solution

To achieve the objective above, an apparatus for displaying a POI according to one aspect of the present invention comprises an output unit displaying a screen for path guiding; and a controller displaying a screen for POI guiding where a POI belonging to at least one or more categories is displayed in the form of a list and the screen for path guiding at the same time.

A method for displaying a POI according to another aspect of the present invention comprises displaying a screen for path guiding; displaying at least one or more POI categories; and in case at least one or more categories are selected from the displayed categories, displaying a screen for POI guiding which displays a searched POI among POIs belonging to the selected categories in the form of a list simultaneously with but separately from the screen for path guiding.

A computer-readable recoding medium according to yet another aspect of the present invention records a program intended for executing one of the methods in a computer.

Details of other embodiments will be provided in the detailed description below and appended drawings.

Advantageous Effects

An apparatus and method for displaying a POI according to one embodiment of the present invention searches a POI according to multiple categories and provides the search result in a screen for path guiding, thereby facilitating a driver to recognize information of the POI.

Therefore, the present invention is capable of increasing accessibility to POIs.

DESCRIPTION OF DRAWINGS

The accompanying drawings, which are included to provide a further understanding of this document and are incorporated on and constitute a part of this specification, illustrate embodiments of this document and together with the description serve to explain the principles of this document.

BEST MODE

Mode for Invention

Advantages and characteristics of the present invention and a method for achieving the above will be clearly understood by referring to the embodiments described in detail below with reference to appended drawings. However, the present invention is not limited to the embodiments to be disclosed below but can be implemented in various forms different from each other. The embodiments of this document are introduced only to complete the disclosure of the present invention and provided for those skilled in the art to which the present invention belongs to be fully informed of the technical scope of the present invention; thus, the present invention is defined only by the scope of appended claims.

Figure 1:
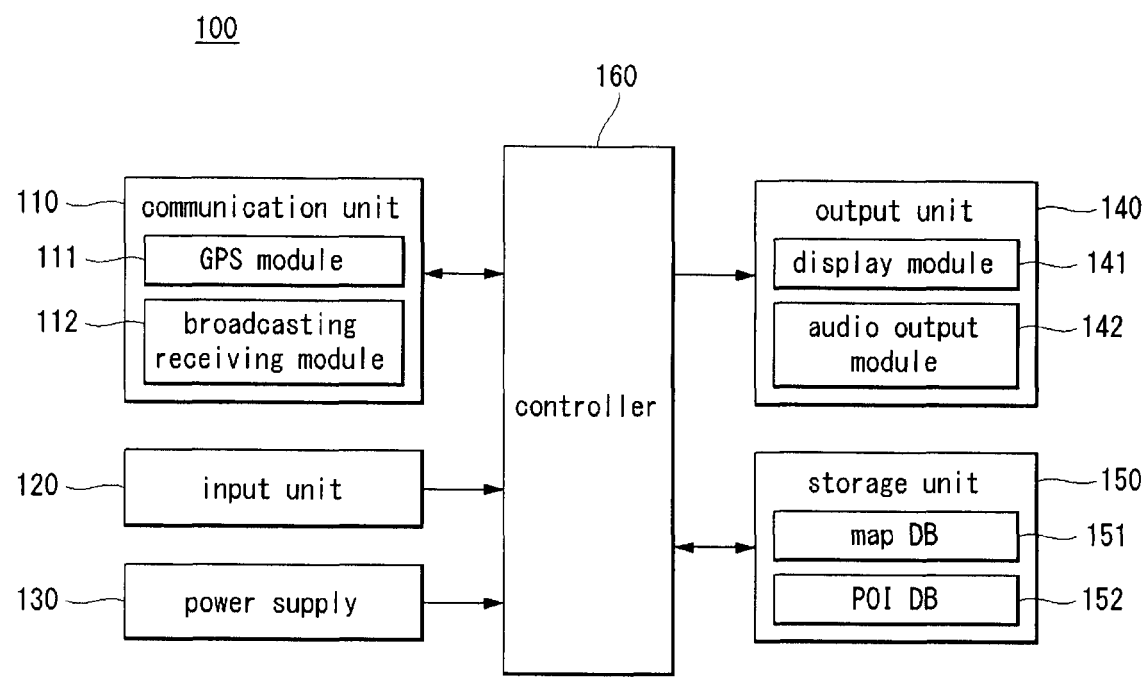
FIG. 1 is a block diagram of an apparatus for displaying a POI.

FIG. 1 is a block diagram of an apparatus for displaying a POI.

With reference to FIG. 1, an apparatus for displaying a POI 100 according to one embodiment comprises a communication unit 110, an input unit 120, a power supply 130, an output unit 140, a storage unit 150, and a controller 160.

The apparatus for displaying a POI 100 can be realized in the form of a terminal equipped with a memory means and computing power by incorporating a microprocessor such as a mobile phone, a smart phone, a laptop computer, a digital broadcasting terminal, a PDA (Personal Digital Assistant), a PMP (Portable Multimedia Player), a navigation device, a UMPC (Ultra Mobile Personal Computer), and a tablet PC.

In what follows, it should be noted that this document employs a navigation terminal as an example of an apparatus for displaying a POI 100. Also, the configuration according to an embodiment of the present invention can be applied to a fixed terminal such as a digital TV, a desktop computer, and the like except for those cases applicable only for the apparatus for displaying a POI 100.

The communication unit 110 comprises a GPS module 111 and a broadcasting transmit and receive module 112; although not shown in the figure, the communication unit 110 can comprise a wireless Internet module (not shown), a short range communication module (not shown), a wired communication module (not shown) and so on.

The GPS module 111 updates position information by receiving GPS signals at a predetermined period. To this end, the GPS module 111 may be equipped with an antenna for receiving signals, a memory, a GSP chip, a GRF chip filter, a controller chip, and so on. The GPS module 111 is connected to the controller 160 which receives and processes position information calculated by the GPS module 111 and controls the operation of the GPS module 111. Since various types of GPS modules are already in the market, a detailed description of the structure of the GPS module 111 will not be provided hereafter.

The broadcasting transmit and receive module 112 transmits and receives broadcasting signals through various types of broadcasting systems. Here, a broadcasting system refers to DMBT (Digital Multimedia Broadcasting Terrestrial), DMBS (Digital Multimedia Broadcasting Satellite), MediaFLO (Media Forward Link Only), DVBH (Digital Video Broadcast Handheld), or ISDBT (Integrated Services Digital Broadcast Terrestrial). Broadcasting signals transmitted and received through the broadcasting transmit and receive module 112 may include traffic information, lifestyle information, and so on.

The wireless Internet module obtains or transmits information by accessing the wireless Internet. Here, the wireless Internet refers to WLAN (Wireless LAN), Wibro (Wireless broadband), Wimax (World interoperability for microwave access), and so on.

The short range communication module transmits and receives various signals and data through short range communication with other devices. The short range communication module can communicate with other devices by using a communication method such as Bluetooth, RFID (Radio Frequency Identification), IrDA (Infrared Data Association), UWB (Ultra WideBand), ZigBee, and so on.

The wired communication module transmits and receives various signals and data to and from other devices connected thereto by wire. For example, the wired communication module can communicate with other devices connected thereto through a USB cable.

The input unit 120 converts a physical input from the outside of the apparatus for displaying a POI 100 into a particular electrical signal. The input unit 120 can comprise a key input module receiving an input from a user's push motion; a microphone receiving the user's voice and sounds generated in a surrounding environment; and so on.

The power supply 130 provides power required for operating the apparatus for displaying a POI 100 or operating other devices connected to the apparatus for displaying a POI 100. The power supply 130 may be a battery embedded inside the apparatus for displaying a POI 100 or a device receiving power from an external device.

The output unit 140 is used for displaying a screen for path guiding which provides a navigation path of a vehicle, outputting various signals and data. More specifically, the output unit 140 can comprise a display module 141 and an audio output module 142.

The display module 141 outputs visually recognizable data. The display module 141 can include at least one of LCD (Liquid Crystal Display), TFT-LCD (Thin Film Transistor Liquid Crystal Display), OLED (Organic Light Emitting Diode), flexible display, and 3D display. In case touch sensors of the display module 141 detecting a touch motion form a mutual layer structure, the display module 141 can carry out the role of the input unit 120 while it carries out the role of a data output unit.

The audio output module 142 outputs an audibly recognizable data. The audio output module 142 can output data in the form of a sound through a speaker. Also, the audio output module 142 can transmit data to an earphone or headset connected to a navigation terminal in a wired or wireless manner. Afterwards, the earphone or headset can output the received data in the form of a sound.

The storage unit 150 stores programs or data required for operating the navigation terminal or data generated by a motion. The programs or data required for operating the navigation terminal include OS (Operating System), a path planning application, map data, and so on. The data generated from the operation of the navigation terminal include information of a searched path, information for guiding, and so on.

The storage unit 150 according to the present invention can include a map DB 151 and a POI DB 152. The map DB 151 refers to data of the entire nation and a database incorporating path guiding data in association with the map data. The POI DB 152 refers to a database incorporating data for various facilities (position, size, name, and so on). In a normal setting, the POI DB 152 is displayed being mapped onto the map DB 151 when POIs are displayed on a navigation screen.

In addition, the storage unit 150 stores a control program for controlling the overall functions of a navigation system. The control program includes a control program for controlling a function of path guiding in a general setting and a function of displaying a screen for path guiding and a screen for POI guiding at the same time.

The storage unit 150 may be a storage medium embedded inside the navigation terminal or a removable storage medium. Here, a storage medium can be implemented by a flash memory, hard disk, card-type memory (for example, SD memory, XD memory, and so on), RAM (Random Access Memory), SRAM (Static Random Access Memory), ROM (Read Only Memory), EEPROM (Electrically Erasable Programmable Read Only Memory), PROM (Programmable Read Only Memory), magnetic memory, magnetic disk, optical disk, and so on.

The controller 160 searches a POI belonging to at least one or more POI categories selected by the user from among at least one or more POI categories.

The categories are formed by grouping various POIs according to a predetermined criterion. For example, facilities near a navigation path may be categorized as follows.

Facility information provided through a navigation system related to traffic, education, high-rise buildings, convenience, shopping, finance, public use, road, accommodation, sports, culture, and so on is categorized as described above and the categorization result is provided for the user to carry out a further selection.

Also, the categories can be generated manually by the user. For example, criteria used frequently by drivers such as a restaurant, gas station, parking area, hotel, discount store, and the like are predetermined for the categorization and stored for later use.

If the user selects multiple categories from among the at least one or more categories, the controller 160 searches for POIs belonging to each of the multiple categories selected and displays the searched POIs on the output unit 140.

At this time, the controller 160 constructs a screen for POI guiding according to a predetermined criterion and displays the screen on the output unit 140. For example, the controller 160 may construct the screen for POI guiding to display POIs in the order of shortest distances of the POIs from a vehicle independently of categories and display the constructed screen for POI guiding.

Also, the controller 160 can display the searched POIs on the output unit 140 by separating them according to categories. In other words, the controller 160 can display at least one or more POIs on the display unit 140 in the form of a grouping result according to predetermined categories.

The method for the controller 160 to construct a screen for POI guiding is not limited to the example described above but can be extended to accommodate various other criteria not mentioned in this document.

Meanwhile, the screen for POI guiding can be displayed on a screen in the form of a list. The list can include information such as an image icon of a POI, the name of the POI, the remaining distance from a vehicle, and so on.

For example, suppose the POI that the user requested for search is a gas station and the number of searched gas stations is three. Gas station 1 to 3 may be run by separate companies and the individual distances to the gas stations from a vehicle may also vary from each other. In this case, the image icon may correspond to a unique logo of a company operating the corresponding gas station. Therefore, a unique logo of the gas station, gas station name, and information about the remaining distance to the gas station can be displayed in each cell of the list; and each gas station can occupy a cell, being displayed in the form of a list.

The controller 160 controls the screen for path guiding and the screen for POI guiding to be displayed together. Also, the controller 160 can display the screen for path guiding and the screen for POI guiding to be displayed separately from each other on the output unit 141.

Displaying the screen for path guiding and the screen for POI guiding together implies displaying the screen for path guiding and the screen for POI guiding at the same time on a screen of the apparatus for displaying a POI 100.

Also, displaying the screen for path guiding and the screen for POI guiding separately from each other does not indicate displaying POIs on the screen for path guiding but indicates a situation where the screen for path guiding and the screen for POI guiding are processed and displayed as separate images.

For example, individual POI names can be displayed on the corresponding positions on the screen for path guiding. An image (which includes an icon image) representing the category of the POI can also be displayed together. In this case, it becomes difficult to estimate the distance between the POI and a current position of a vehicle; to solve the problem above, the controller 160 may not display a predetermined identifier representing the POI on the screen for path guiding but can construct a screen for POI guiding independently of the screen for path guiding and display the constructed screen for POI guiding together with the screen for path guiding.

The controller 160 can display the screen for path guiding and the screen for POI guiding on the output unit 140 by PIP (Picture in Picture) or PBP (Picture by Picture).

The PIP function, along with PBP function, displays two or more screen at the same time on a display screen. PIP is one implementation of multi-tasking, where navigation and other application programs are operated at the same time.

In the case of PIP, the controller 160 displays the screen for path guiding as a main screen while displaying the screen for POI guiding as an auxiliary screen. The controller 160 can display the screen for path guiding, which is an execution result of a navigation system, in a full screen while displaying the screen for POI guiding in a part of the full screen.

In the case of PBP, each of the screen for path guiding and the screen for POI guiding is displayed to have a square aspect ratio or an aspect ratio of 8 to 10, filling the entire screen of the apparatus for displaying a POI 100.

Also, in the case of PIP, if the auxiliary screen overlaps with a forward navigation path of a vehicle on the main screen, the controller 160 can move the auxiliary screen to another area of the main screen not overlapping with the navigation path. For example, if the auxiliary screen is fixed at a particular position of the main screen, the screen for path guiding is occluded by the screen for path guiding, preventing a driver from easily recognizing a navigation path of his or her vehicle. In this case, the controller 160 of the apparatus for displaying a POI 100 according to one embodiment of the present invention detects a rear area of a vehicle's moving direction or an area independent of the moving direction from the area of the screen for path guiding and moves the screen for POI guiding to the detected area.

Also, the controller 160 can update and display a search result for POIs on the list in real-time. In other words, the controller 160 calculates the remaining distance from a vehicle to the searched POI and updates the remaining distance calculated in real-time.

Meanwhile, in case a vehicle displayed on the screen for path guiding passes by one of POIs on the list, the controller 160 can update the POI list by removing the POI on the list that the vehicle has passed by.

Also, the controller 160 can add at least one or more POIs displayed on the screen for POI guiding as way points or destination points and re-establish a navigation path by reflecting the way points or destination points added.

Figure 2:
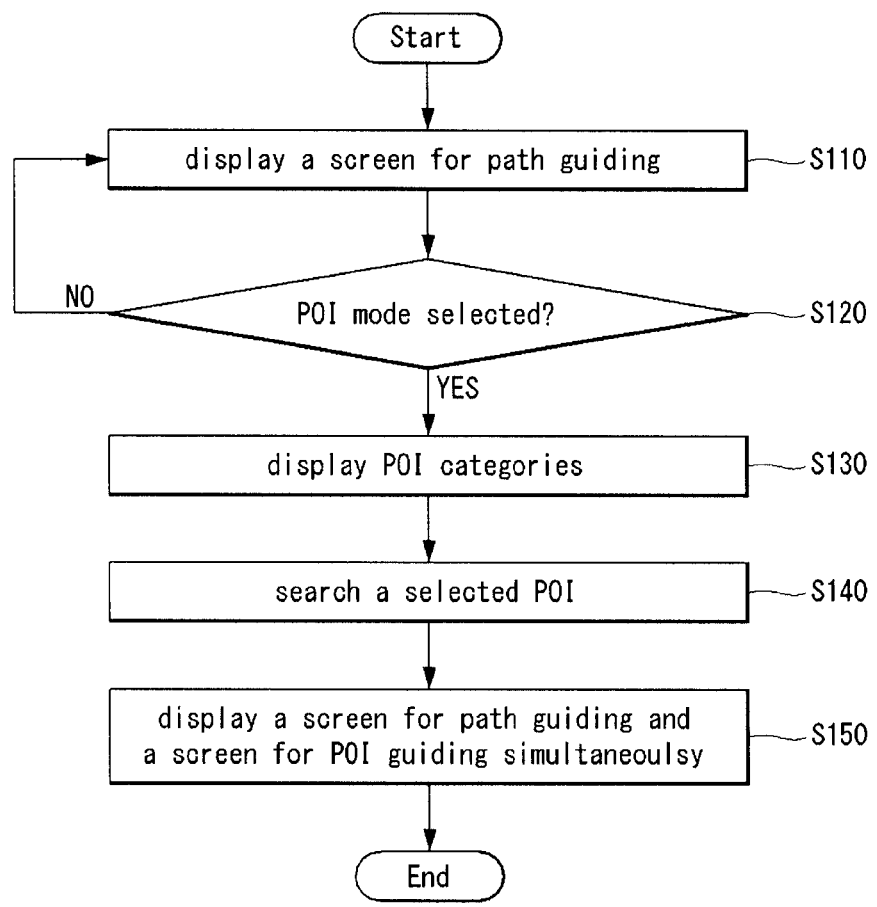
FIG. 2 is a flow diagram illustrating a flow of a method for displaying a POI according to another embodiment of the present invention.

FIG. 2 is a flow diagram illustrating a flow of a method for displaying a POI according to another embodiment of the present invention.

First, the controller 160 of the apparatus for displaying a POI 100 searches for a navigation path of a vehicle based on a map DB 151 and a POI DB 152 stored in the storage unit 150. The controller 160 displays on the output unit 140 a screen for path guiding showing the searched navigation path S110.

Next, if the user selects a POI mode S120: YES, the controller 160 controls the output unit 140 to display a POI category S130.

The POI category may comprise multiple categories and the user can add or delete individual categories.

If at least one or more categories are selected from among the multiple categories, the controller 160 searches POIs corresponding to the selected categories 5140 and constructs a screen for POI guiding by using the searched POIs and displays on the output unit 140 the constructed screen for POI guiding together with a screen for path guiding.

For example, suppose the multiple categories correspond to "gas station", "restaurant", "hotel", and "parking area" and the user selects "gas station" and "parking area". The controller 160 then searches a neighboring area of a vehicle for "gas station" and "parking area" by matching position information of the vehicle obtained from the GPS module 111 with the map DB 151 and the POI DB 152. In case searched "gas stations" are gas station A (company S and 500 m from the vehicle) and gas station B (company G and 1 km from the vehicle); and searched "parking areas" are parking area a (300 m from the vehicle) and parking area b (600 m from the vehicle), the controller 160 can display on the output unit 150 by setting up a list in the order of "parking area a, gas station A, parking area b, gas station B" based on the distances from the vehicle irrespective of categories. Also, if "gas station" is selected, the controller 160 makes information about gas station A and B included under "gas station" item displayed on the screen for POI guiding, which applies in the same way for the case of "parking area".

Therefore, to allow the user to configure a guiding screen through the input unit 120 according to his or her needs, the screen for POI guiding may be equipped with a "gas station" block, "parking area" block, and "ALL" block where gas station information and parking area information can be displayed together.

When a strategy for configuring the screen for POI guiding is set up, the controller 160 constructs the screen for POI guiding according to the configuration strategy and displays on the output unit 140 the constructed screen for POI guiding together with the screen for path guiding.

A procedure of displaying the screen for path guiding together with the screen for POI guiding on the output screen 140 will be described in more detail with reference to FIG. 3.

Figure 3:
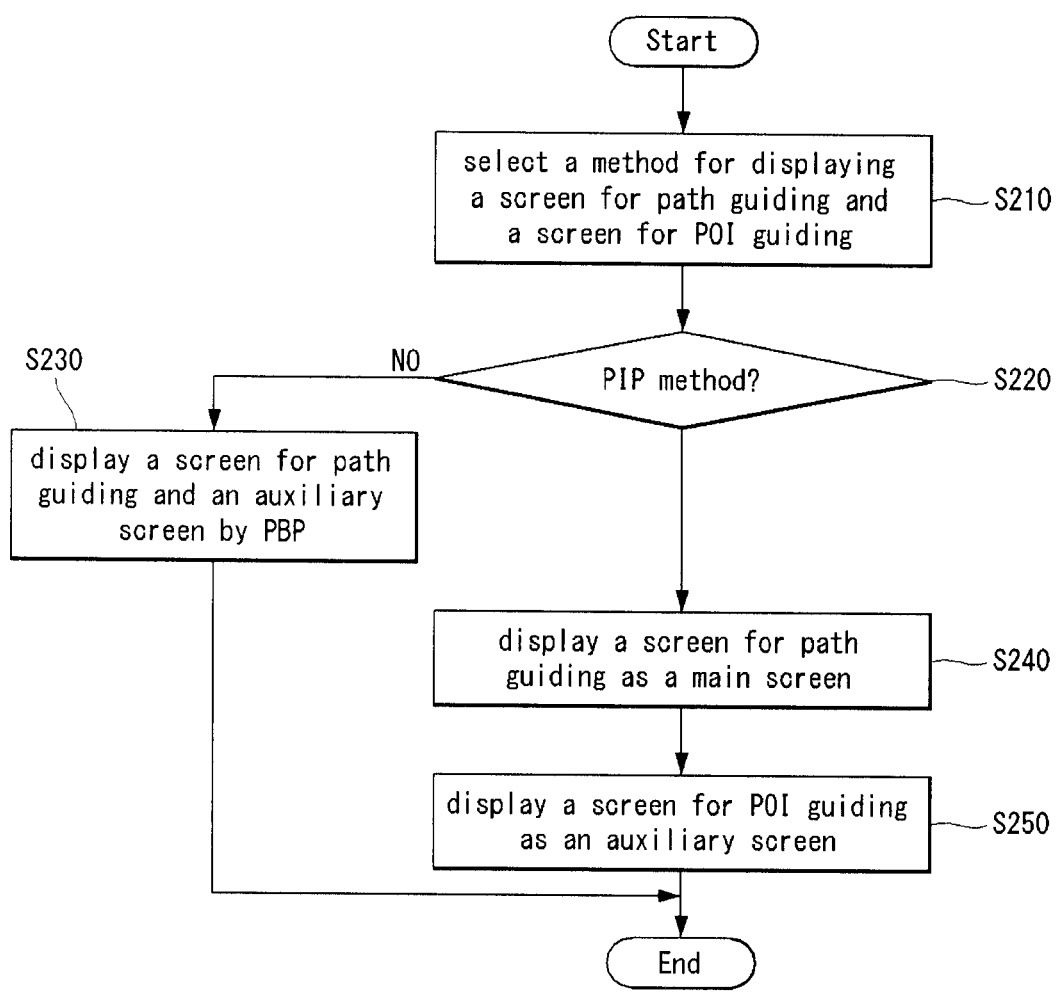
FIG. 3 is a flow diagram illustrating a procedure of displaying a screen for path guiding and a screen for POI guiding simultaneously.

FIG. 3 is a flow diagram illustrating a procedure of displaying a screen for path guiding and a screen for POI guiding simultaneously.

With reference to FIG. 3, the user can select beforehand a method for displaying a screen for path guiding and a screen for POI guiding on the output unit 140 S210.

In case the user selects PIP S220: YES, the controller 160 can display the screen for path guiding as a main screen on the entire screen of the apparatus for displaying a POI 100, S240.

When construction of the screen for POI guiding is completed, the screen for POI guiding can be displayed on the output unit 140 of the apparatus for displaying a POI 100 together with the main screen by displaying the screen for POI guiding as an auxiliary screen of the main screen S250.

If the user selects PBP, the controller 160 can control the output unit 140 to display the screen for path guiding and the screen for POI guiding separately from each other to form the main screen.

Therefore, the entire screen of the apparatus for displaying a POI 100 is divided into the screen for path guiding and the screen for POI guiding. The aspect ratio can be set up beforehand by the user. If the aspect ratio is 5 to 50, it becomes the same as POP (Picture out Picture) display.

FIGS. 4 to 8 are examples illustrating a screen of the apparatus for displaying a POI where a method for displaying a POI illustrated in FIG. 3 is implemented.

Figure 4:
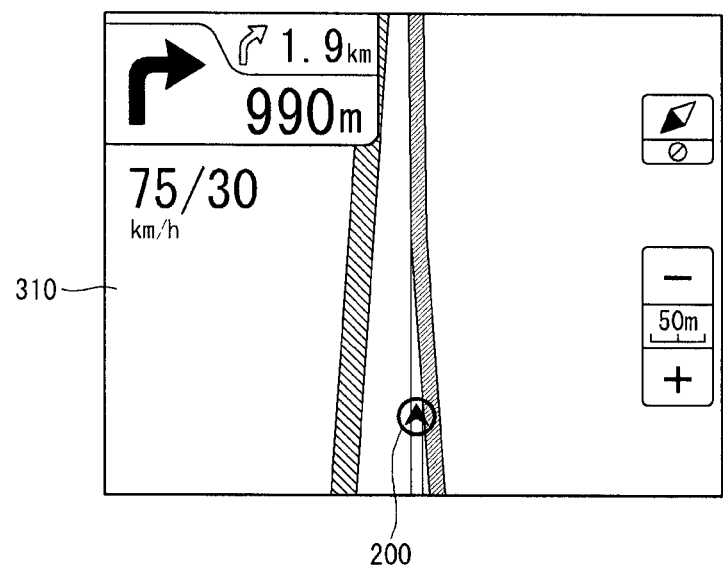
FIG. 4 is an example where a screen for path guiding is displayed on a screen of an apparatus for displaying a POI according to one embodiment of the present invention.

With reference to FIG. 4, the controller 160 of the apparatus for displaying a POI can display the screen for path guiding on the output unit 140.

POI mode denotes a mode in which a screen for path guiding and a screen for POI guiding are displayed at the same time. Before the POI mode is carried out, the screen for path guiding fills the entire screen of the apparatus for displaying a POI 100.

Figure 5:
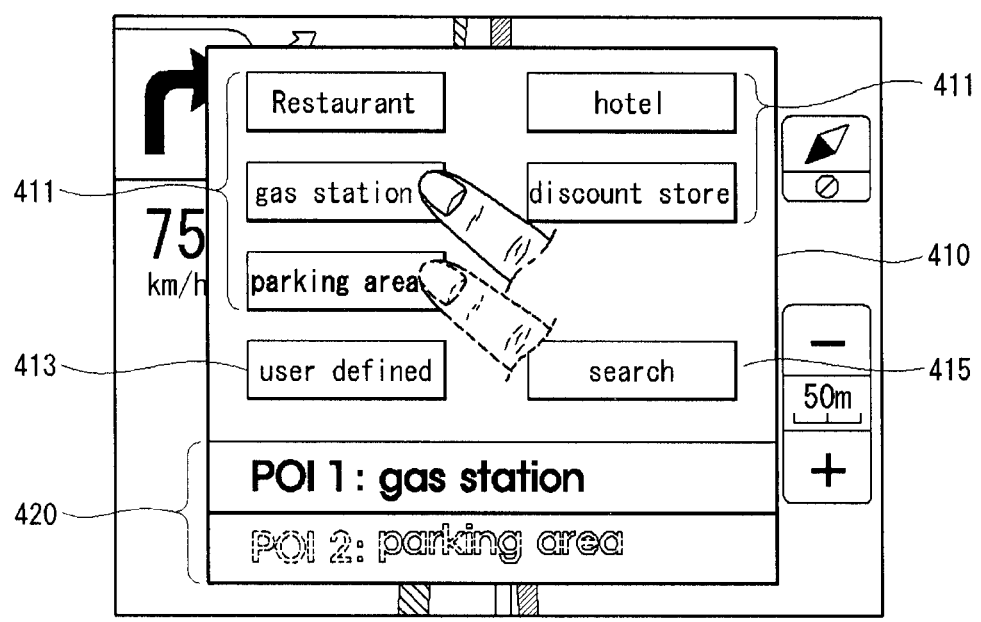
FIG. 5 is an example where a menu of multiple categories is displayed on the screen for path guiding of FIG. 4.

With reference to FIG. 5, in case POI mode is activated, a multiple category menu screen 410 including at least one or more categories can be displayed on the screen for path guiding 310.

The multiple category menu screen 410 can include at least one or more POI categories 411. For example, restaurants, gas stations, parking areas, hotels, and discount stores form individual categories and the respective POIs under the categories are searched for and displayed on the screen of the apparatus for displaying a POI 100.

The categories can be set up in various ways by the user. For example, suppose there exist POIs of gas stations (category 1), car washes (category 2), Korean restaurants (category 3), and western restaurants (category 4).

With such categories, a gas station and a car wash may belong to a category related to car services. Also, Korean restaurants and western restaurants may belong to a restaurant category.

Therefore, as shown in Table 1 below, predetermined categories can be further grouped into POI categories of the same type.

TABLE 1

| Car service-related POI | Restaurant-related POI |
| --- | --- |
| Gas station | Korean restaurant |
| Car wash | Western restaurant |

As can be seen from Table 1, in case a driver wants information about both of a gas station and a car wash, categories can be set up as shown in Table 1. In this case, gas stations and car washes in a neighboring area of a current location of a vehicle can be all found.

Meanwhile, gas stations and car washes in Table 1 can correspond to categories independent from each other. For example, when gas stations are searched for in a neighboring area of the vehicle, various gas stations can be found and the gas stations found can be provided on a screen in the form of a list.

In other words, the scope of the category can be narrowed down as shown in Tables 2 to 3.

TABLE 2

| Gas station | Car wash |
| --- | --- |
| SK: | 500 m ahead |
| GS: | 1 km ahead |
| S-oil: | 2 km ahead |

TABLE 3

| Gas station | Car wash |
| --- | --- |
| Car wash 1: | 500 m ahead |
| Car wash 2: | 1 km ahead |
| Car wash 3: | 2 km ahead |

As described above, predetermined POIs can be categorized by the user according to various criteria.

The multiple category menu screen 410 can further include a user-defined block 413 and a search block 415. The user-defined block 413 provides a function by which a new category can be added or a pre-established category can be removed by the user.

Therefore, the storage unit 150 of the apparatus for displaying a POI 100 can store in the POI DB 152 all of POIs which can be searched for and recognized by the apparatus for displaying a POI 100 by categorizing the POIs according to a predetermined criterion.

If a category to be newly added through the user-defined block 413 does not exist in the POI DB 152, the category cannot be added.

In this case, it is preferable to help the user carry out a category adding task by displaying a list of categories that can be defined by the user-defined block 413 on the screen of the apparatus for displaying a POI 100.

Also, in case a particular category is selected by the user, the search block 415 delivers a search command to the controller 160 to carry out search for POIs corresponding to the selected category.

If the user selects the "gas station" as a first category, the name of the selected category can be displayed in a lower part of the multiple category menu screen 410. Also, if the "parking area" is selected as a second category, as described before, the name of the second category can be displayed in a lower part of the multiple category menu screen 410. The above scheme is intended for informing the user of the category that he or she has selected and for checking POIs that are to be actually searched for.

If the first and second category are selected by the user and the search block 415 is touched, the controller 160 of the apparatus for displaying a POI 100 searches for gas stations and car washes located near the vehicle. After the search, the screen for path guiding and the screen for POI guiding are displayed on the screen of the apparatus for displaying a POI 100, which will be described with reference to FIG. 6.

Figure 6:
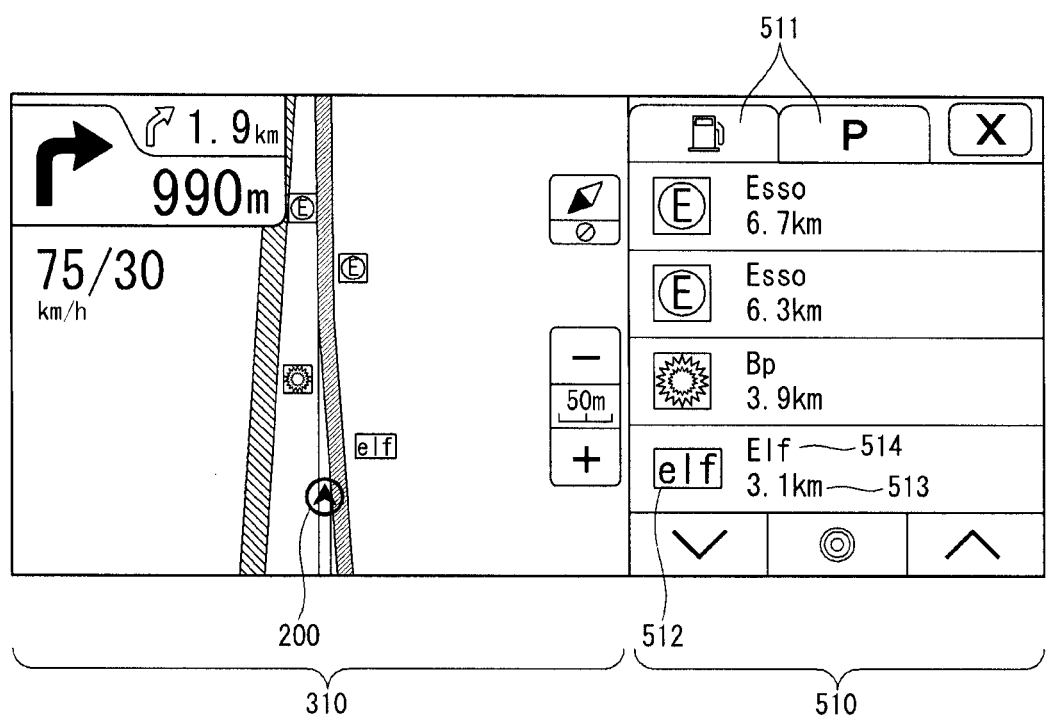
FIG. 6 is an example where the screen for path guiding and the screen of POI guiding of FIG. 4 are displayed together according to PBP method.

FIG. 6 is an example where the screen for path guiding and the screen of POI guiding of FIG. 4 are displayed together according to PBP method.

With reference to FIG. 6, the screen of the apparatus for displaying a POI 100 is displayed being split into a screen for path guiding 310 and a screen for POI guiding 510 according to PBP method.

In the left-hand side screen, the screen for path guiding 310 is displayed while in the right-hand side screen, the screen for POI guiding 510 is displayed.

Unique logos (such as image icons) of individual gas stations are displayed at particular positions on the screen for path guiding 310 along a moving direction of a vehicle 200.

Distance from the vehicle to each of four gas stations can be hardly known from the screen for path guiding 310 of FIG. 6.

If the screen for POI guiding 510 provides the remaining distance information from the vehicle together, a heading direction and distance of each gas station can be known at the same time.

The screen for POI guiding 510 can be provided in the form of a list.

The list can include an image icon 512 of a POI, the name 514 of the POI, and the remaining distance information 513 from the vehicle.

For example, the screen for POI guiding of FIG. 6 illustrates a case where the user selects a "gas station" category and informs that a gas station named as "Elf" is located at a position 3.1 km away from the vehicle 200.

Also, the heading direction of the "gas station Elf" can be provided through the screen for path guiding 310. As can be seen from FIG. 6, the names of searched gas stations are Elf (the remaining distance from the vehicle is 3.1 km), Bp (the remaining distance from the vehicle is 3.9 km), and Esso (the remaining distances of the two gas stations are 6.3 km and 6.7 km, respectively).

The number of selected categories determines the way how searched POIs are displayed on the screen for POI guiding 510.

With reference to FIG. 6, image icons 511 representing a gas station and parking area can be disposed in an upper part of the screen for POI guiding. The number of the image icons 511 can be added as many as the number of categories selected by the user.

In case an image icon for gas stations is selected by the user, a list of gas stations searched by the controller 160 of the apparatus for displaying a POI 100 is displayed.

At this time, POIs can be searched for according to a predetermined criterion.

For example, the controller 160 first searches for POIs located within a radius of a predetermined distance from the vehicle (first search range) and subsequently searches for POIs within a second search range which is larger than the first search range. Therefore, as the search range is enlarged, information of POIs displayed or updated individually on the screen of the apparatus for displaying a POI 100, particularly on the screen for path guiding 310 and the screen for POI guiding 510 may increase accordingly.

On the contrary, in case the vehicle passes by a POI at one location, the corresponding information disappears from the screen for path guiding 310 and the screen for POI guiding 510.

Therefore, a search result reflected in real-time by searching for POIs in real-time can be notified to the user while driving.

Meanwhile, the screen for POI guiding 510, different from FIG. 6, may display POIs according to categories. In other words, POIs can be displayed according to the order of the remaining distances from the vehicle. An example of constructing the screen for POI guiding is not limited to the above but can be implemented in various other forms.

Figure 7:
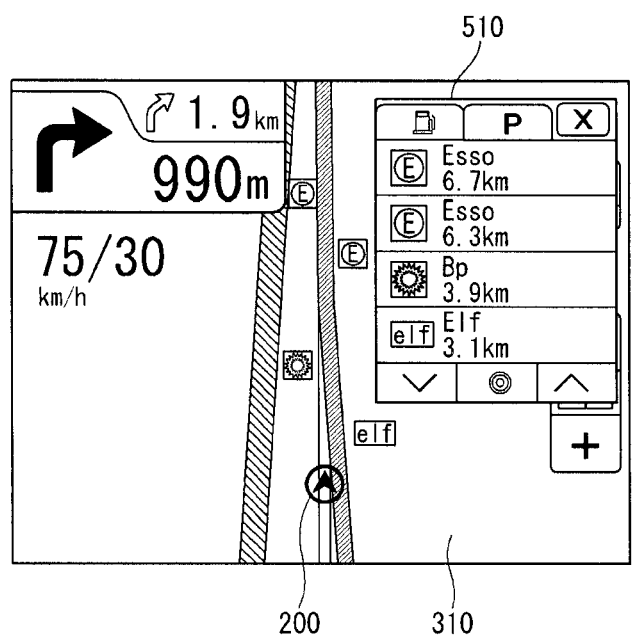
FIGS. 7 to 8 are examples where the screen for path guiding and the screen of POI guiding of FIG. 4 are displayed together according to PIP method.
Figure 8:
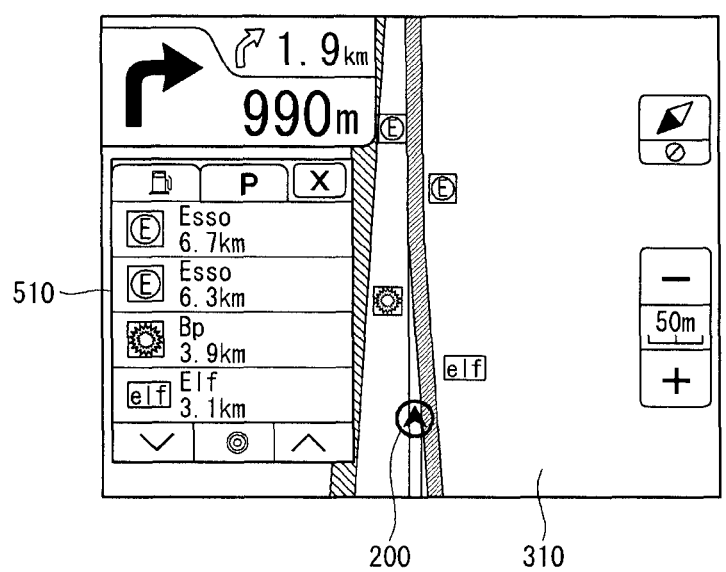

FIGS. 7 to 8 are examples where the screen for path guiding and the screen of POI guiding of FIG. 4 are displayed together according to PIP method.

FIG. 7 illustrates a screen where the screen for POI guiding 510 is located in the right-hand side of a navigation path of the vehicle 200 when the screen for path guiding 310 corresponds to the entire screen whereas FIG. 8 illustrates a screen where the screen for POI guiding 510 is located in the left-hand side of a navigation path of the vehicle 200 when the screen for path guiding 310 corresponds to the entire screen. The navigation path of the vehicle 200 forms a straight line in FIGS. 7 to 8.

However, the navigation path of the vehicle 200 can take various other forms.

For example, the navigation path can be changed frequently for such cases as intersections, roads going along mountains, and so on. As mentioned above, in case the screen for POI guiding 510 is fixed at a particular position while the navigation path of the vehicle 200 changes arbitrarily in real-time, the screen for POI guiding 510 may occlude the navigation path of the vehicle 200. This kind of problem may occur particularly when the screen for path guiding and the screen for POI guiding are displayed by PIP.

Figure 9:
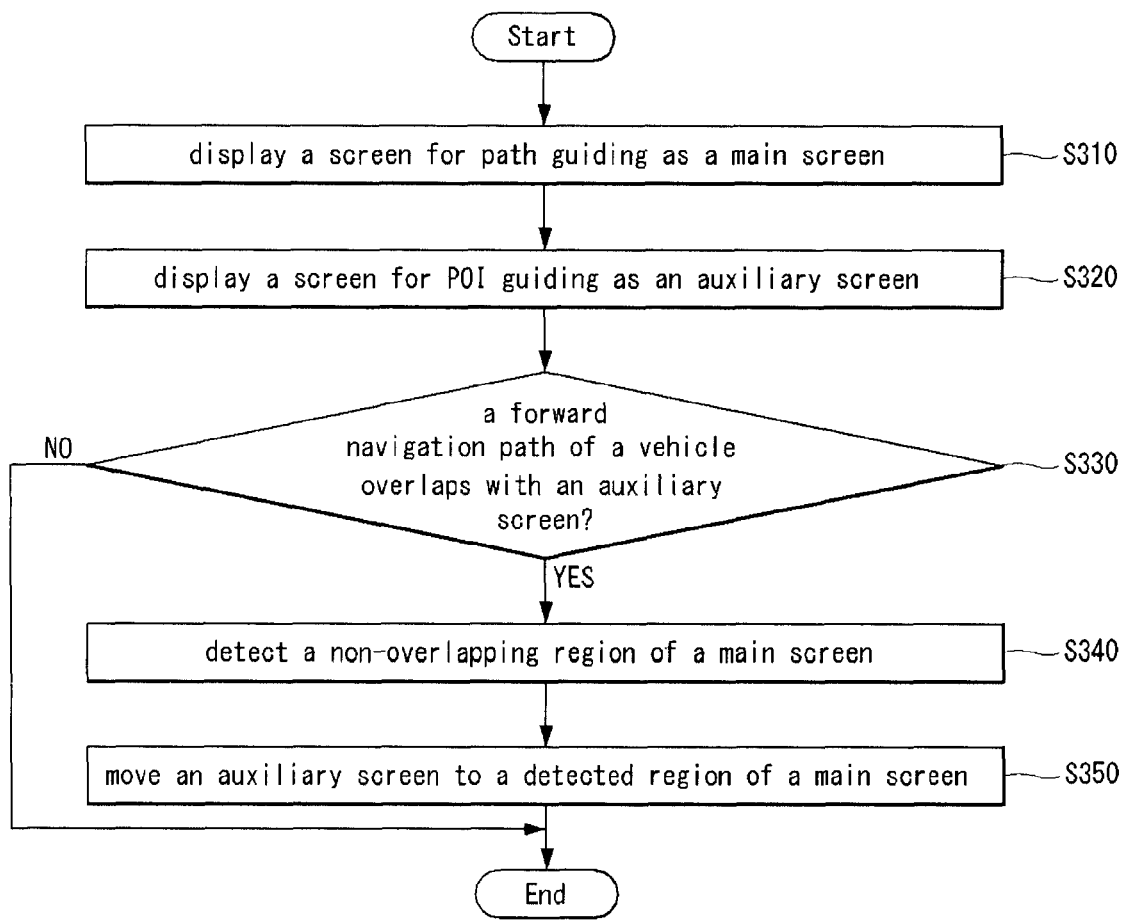
FIG. 9 is a flow diagram illustrating a procedure of moving an auxiliary screen in the PIP method of FIGS. 7 to 8.

FIG. 9 is a flow diagram illustrating a procedure of moving an auxiliary screen in the PIP method of FIGS. 7 to 8.

With reference to FIG. 9, the controller 160 displays a screen for path guiding on the screen of the apparatus for displaying a POI 100, 5310.

Then, the screen for path guiding is displayed as a main screen and a screen for POI guiding is displayed as an auxiliary screen by PIP 5320.

While the main screen and the auxiliary screen are displayed by PIP, a forward navigation path of a vehicle may overlap with the auxiliary screen.

In this case, the controller 160 detects a region of the main screen where the forward navigation path of the vehicle does not overlap with the auxiliary screen 5340.

The detected region of the main screen may correspond to a region of the main screen where the auxiliary screen makes no overlap with the navigation path of the vehicle or a region of the main screen where the auxiliary screen overlaps with part or the whole of the navigation path behind the vehicle.

The controller 160 moves the auxiliary screen to the detected one region of the main screen 5350. Accordingly, the driver can be saved from the difficulty in recognizing a path caused as the auxiliary screen occludes the forward navigation path of the vehicle.

Figure 10:
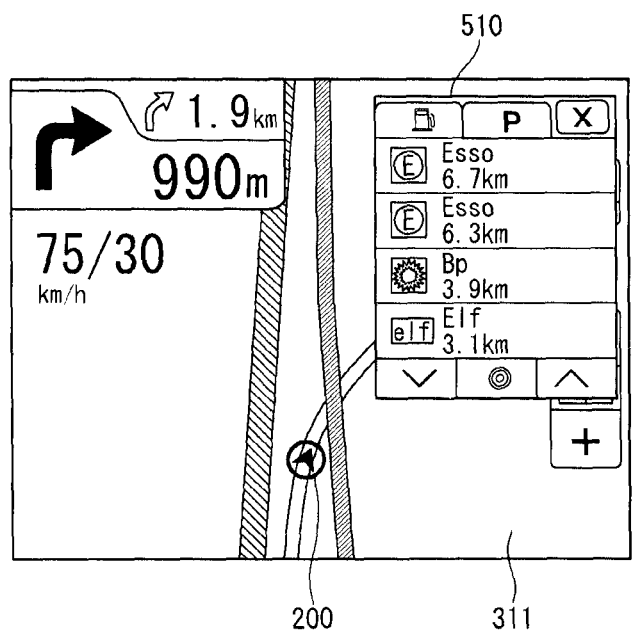
FIGS. 10 to 11 are examples illustrating a procedure of moving an auxiliary screen shown in FIG. 9.
Figure 11:
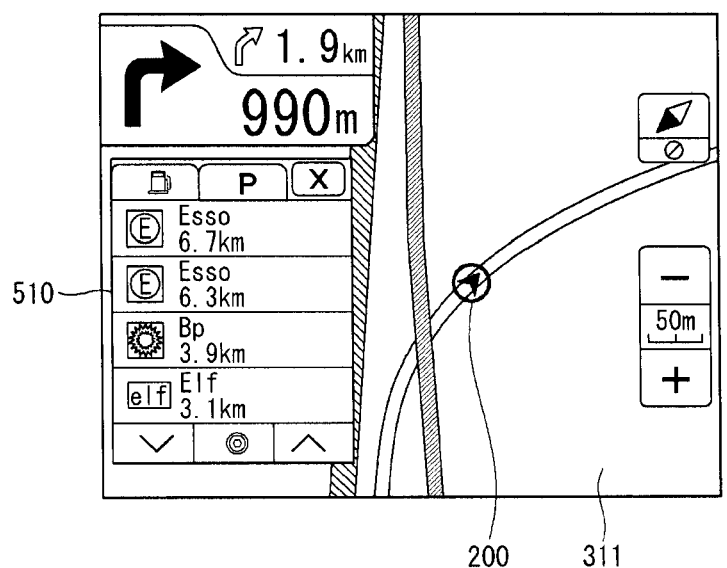

FIGS. 10 to 11 are examples illustrating a procedure of moving an auxiliary screen shown in FIG. 9.

FIG. 10 illustrates a case where a navigation path of a vehicle 200 on the screen for path guiding 311 makes a sharp turn to the right. Also, the screen for POI guiding 510 is located along an upper, right-hand side direction with respect to the navigation direction and overlaps with the forward navigation path of the vehicle.

In this case, as long as the overlap causes no difficulty for path guiding according as the screen for path guiding 311 is continuously updated, the aforementioned procedure of moving the screen for POI guiding 510 may not be needed.

However, if the update speed of the screen for path guiding 311 is slow or different from FIG. 10, if the screen for POI guiding 510 overlaps at a position very close to the vehicle, it would be preferable to move the screen for POI guiding 510 to a predetermined region of the main screen as shown in FIG. 11.

A criterion by which to detect a region of the main screen to which the screen for POI guiding 510 is moved may use the one described earlier.

Figure 12:
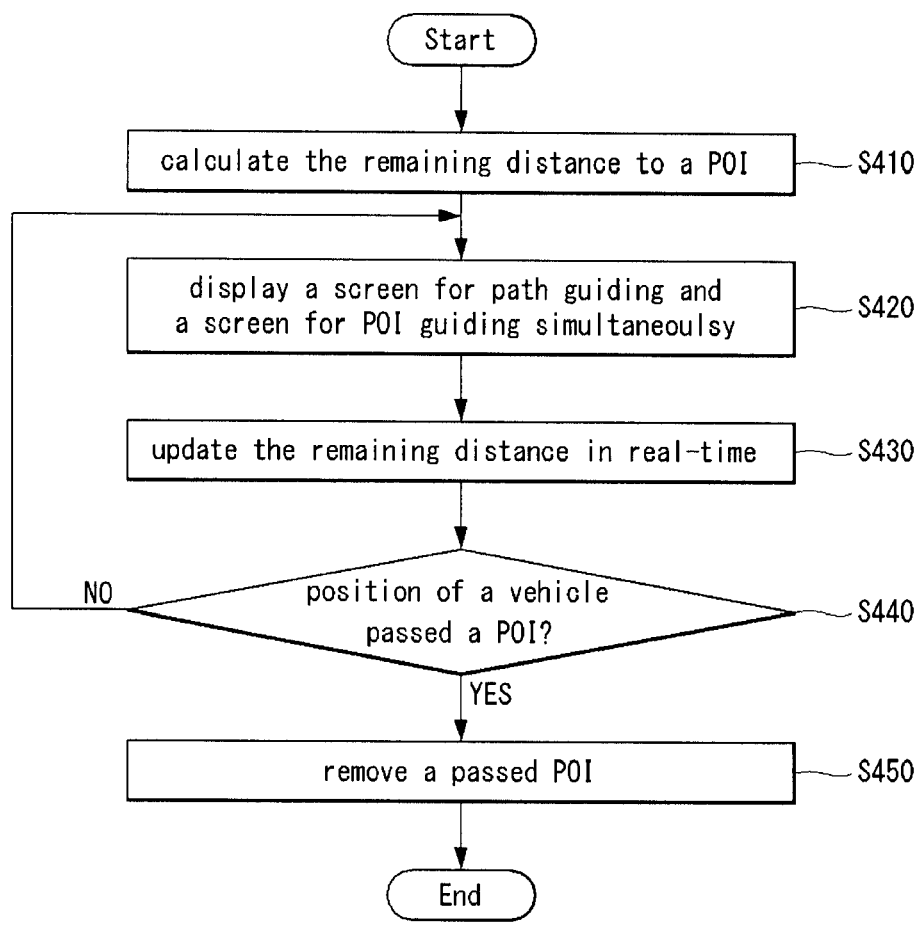
FIG. 12 is a flow diagram illustrating a procedure of updating in real-time POI information to be displayed according to a method for displaying a POI according to one embodiment of the present invention.

FIG. 12 is a flow diagram illustrating a procedure of updating in real-time POI information to be displayed according to a method for displaying a POI according to one embodiment of the present invention.

With reference to FIG. 12, the controller 160 of the apparatus for displaying a POI 100 calculates the remaining distance to a searched POI 5410 and displays a screen for POI guiding including the calculated remaining distance information on the output unit 150 together with a screen for path guiding 5420.

Meanwhile, the controller 160 of the apparatus for displaying a POI 100 re-calculates the remaining distance in real-time as a vehicle navigates, thereby updating the remaining distance information 5430.

Also, the controller 160 of the apparatus for displaying a POI 100 checks whether the vehicle's position passes any one of searched POIs while the remaining distance is updated in real-time. If the vehicle passes a predetermined POI S440: YES, the POI already visited by the vehicle is removed from the screen for POI guiding 5450.

Figure 13:
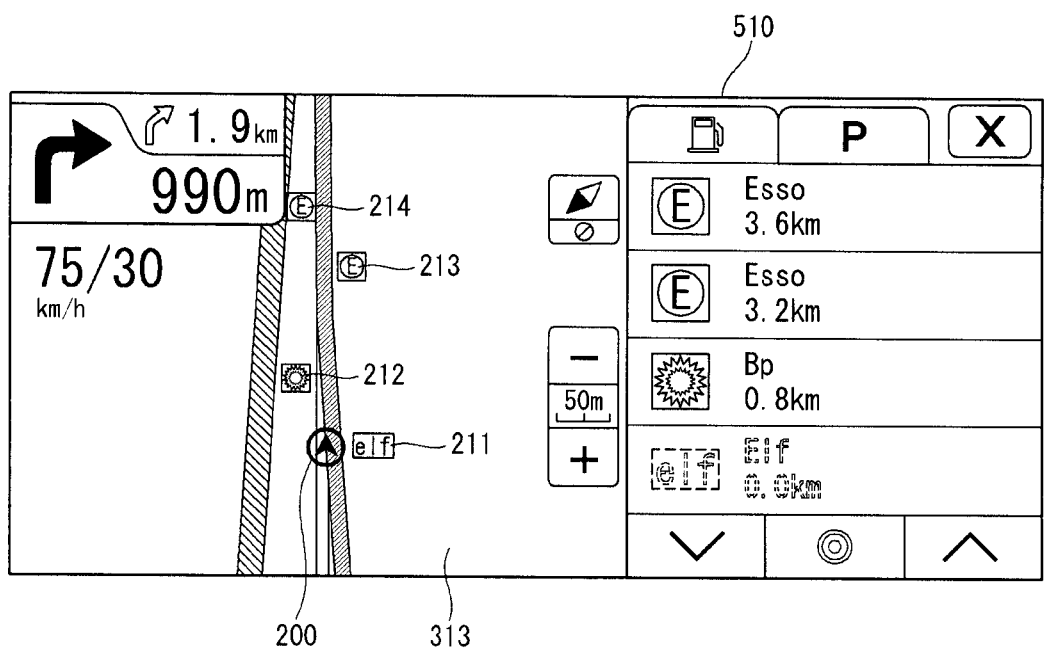
FIGS. 13 to 14 are examples illustrating a procedure of updating POI information shown in FIG. 12.
Figure 14:
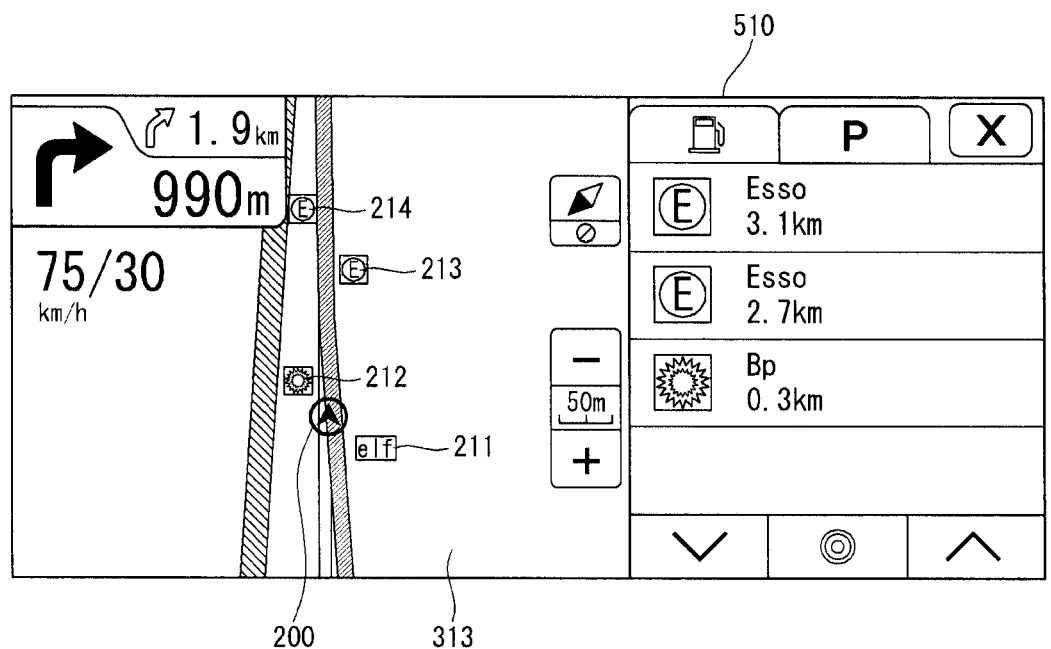

FIGS. 13 to 14 are examples illustrating a procedure of updating POI information shown in FIG. 12.

With reference to FIGS. 13 to 14, the controller 160 of the apparatus for displaying a POI 100 displays a screen for path guiding 313 and a screen for POI guiding 510 on the output unit 140 by PBP. Since descriptions about the screen for path guiding 313 of FIGS. 13 to 14 are the same as described above, they will be omitted.

If a vehicle passes a first POI (a gas station Elf) while the vehicle navigates along a navigation path, distance information on the screen for POI guiding 510 is updated. The remaining distances to the POIs which have been determined respectively as 3.6 km, 3.2 km, 0.8 km, and 0.0 km are updated in real-time.

Afterwards, if the vehicle 200 passes a "gas station Elf", as shown in FIG. 14, the controller 160 updates the remaining distance to each of the POIs on the screen for POI guiding 510 as 3.1 km, 2.7 km, and 0.3 km. Also, the controller 160 can control in such a way that the remaining distance information about the "gas station Elf" disappears from the screen for POI guiding.

In the update procedure above, information about a predetermined POI visited by the vehicle 200 can be accumulated for a predetermined period of time in the storage unit 150 of the apparatus for displaying a POI 100. Therefore, the user can check again anytime from the navigation screen the information of a predetermined POI behind even if a predetermined period of time has passed since the vehicle 200 passed the predetermined POI.

Meanwhile, the apparatus for displaying a POI according to one embodiment of the present invention can use information of searched POIs displayed on the screen for POI guiding for setting up a new navigation path. For example, if the user selects one POI on the screen for POI guiding, the output unit can display a menu inquiring whether to re-establish a navigation path by newly adding the selected POI as a way point or a destination point.

The apparatus for displaying a POI according to one embodiment of the present invention displays the screen for POI guiding and the screen for path guiding simultaneously but separately from each other. Accordingly, a driver can easily recognize the distance and heading direction of a POI while driving. Also, since the screen for POI guiding is displayed being separated from the screen for path guiding, it becomes an easy task to re-establish a path by selecting the POI as a way point or a destination point.

The embodiment of the present invention includes a computer-readable medium including program commands used for carrying out operations implemented in various kinds of computers. The medium records a program for carrying out a method for guiding POI information described above. The medium can incorporate program commands, data files, data structures, and so on individually or in the form of a combination thereof. Examples of such a medium include magnetic media such as a hard disk, floppy disk, and magnetic tape; optical recording media such as CD and DVD; and hardware apparatus constructed to store and carry out program commands such as ROM, RAM, flash memory, and the like. Examples of a program command include not only assembly codes generated by a compiler but also high-level language codes which are executed by a computer using an interpreter.

It should be understood by those skilled in the art to which the present invention belongs that the present invention can be realized in other specific forms without changing the technical principles or fundamental characteristics of the present invention. Therefore, it should be understood that the embodiments described above have all been introduced for illustrative purposes and are not limited to the descriptions above. The technical scope of the present invention is defined by appended claims not by the detailed descriptions; it should be interpreted that meanings and scope of the claims and every possible change or modified forms derived from an equivalent concept of the claims fall into the scope of the present invention.

100: apparatus for displaying a POI
110: communication unit
120: input unit
130: power supply
140: output unit
150: storage unit
200: vehicle

The invention claimed is:

1. An apparatus for displaying a POI, comprising:
an output unit displaying a first screen for path guiding showing a navigation path in front of the vehicle wherein the first screen includes an image icon of the POI; and
a controller displaying a second screen for POI guiding on the output unit such that the POI belonging to at least one or more categories is displayed in the form of a list and the screen for path guiding at the same time such that the second screen does not overlap the navigation path,
wherein the list of the first screen includes the image icon of the POI, a name of the POI, and information about a remaining distance from the vehicle in which the remaining distance is updated by calculating the remaining distance from the vehicle to the POI in real-time and the POI is removed from the list if a position of the vehicle displayed on the screen for path guiding passes by the POI, and
wherein the image icon of the POI is displayed on the first screen along the navigation path and on the second screen until the vehicle passes the POI and then the image icon remains on the first screen while the image icon disappears from the second screen.

2. The apparatus of claim 1, wherein the at least one or more category is selected by the user beforehand.

3. The apparatus of claim 1, wherein the controller displays the screen for path guiding and the screen for POI guiding on the output unit by either PIP (Picture in Picture) or PBP (Picture by Picture).

4. The apparatus of claim 3, wherein the controller, if the screen for path guiding and the screen for POI guiding are displayed by PIP, displays the screen for path guiding as a main screen and displays the screen for POI guiding as an auxiliary screen of the main screen.

5. The apparatus of claim 4, wherein the controller, if the auxiliary screen overlaps with a forward navigation path of the vehicle, detects a region of the main screen where the auxiliary screen does not overlap with the forward navigation path and moves the auxiliary screen to the detected region.

6. The apparatus of claim 1, wherein the controller displays the POI being separated according to categories.

7. The apparatus of claim 1, wherein, if one of POIs from the list is selected, a navigation path of the vehicle is established by setting up the selected POI as a destination point.

8. The apparatus of claim 1, wherein, if one of POIs from the list is selected, the selected POI is added to the pre-established navigation path as a way point.

9. A method for displaying a POI, comprising:
displaying a first screen for path guiding which provides a navigation path in front of a vehicle, wherein the first screen includes an image icon of the POI;
displaying second screen for POI guiding having a list simultaneously with but separately from the first screen for path guiding such that the second screen does not overlap the navigation path,
wherein the list includes the image icon of the POI, a name of the POI, and information about a remaining distance from a vehicle in which the remaining distance is updated by calculating the remaining distance from the vehicle to the POI in real-time and the POI is removed from the list if a position of the vehicle displayed on the screen for path guiding passes by the POI, and
wherein the image icon of the POI is displayed on the first screen along the navigation path and on the second screen until the vehicle passes the POI then the image icon remains on the first screen while the image icon disappears from the second screen.

10. The method of claim 9, wherein the displaying the second screen for POI guiding simultaneously with but separately from the first screen for path guiding displays the first screen for path guiding and the second screen for POI guiding by either PIP (Picture in Picture) or PBP (Picture by Picture).

11. The method of claim 10, if the first screen for path guiding and the second screen for POI guiding are displayed by PIP, comprising,
displaying the first screen for path guiding as a main screen; and
displaying the second screen for POI guiding as an auxiliary screen of the main screen.

12. The method of claim 11, if the auxiliary screen overlaps with a forward navigation path of the vehicle, comprising,
detecting a region of the main screen where the auxiliary screen does not overlap with the forward navigation path; and
moving the auxiliary screen to the detected region.

13. The method of claim 9, wherein the displaying the second screen for POI guiding simultaneously with but separately from the first screen for path guiding displays the at least one or more POIs according to categories.

14. The method of claim 9, further comprising:
selecting the POI from the list to establish a navigation path of the vehicle by setting up the selected POI as a destination point.

15. The method of claim 9, further comprising:
selecting the POI from the list to add the selected POI to the pre-established navigation path as a way point.

16. A non-transitory computer-readable recording medium storing a program for carrying out the method of claim 9.

* * * * *